United States Patent [19]
Gunawardena et al.

[11] Patent Number: 5,657,686
[45] Date of Patent: Aug. 19, 1997

[54] METHOD AND APPARATUS FOR CONTROLLING FLOOR TEMPERATURE IN AN OVEN

[75] Inventors: Ramesh M. Gunawardena, Solon; Ronald D. Lemke, Huron, both of Ohio

[73] Assignee: Stein, Inc., Sandusky, Ohio

[21] Appl. No.: 198,310

[22] Filed: Feb. 18, 1994

[51] Int. Cl.$^6$ .................. A23B 4/044; F27D 1/12
[52] U.S. Cl. .................. 99/478; 99/467; 99/443 C; 126/34; 126/54; 122/7 R; 432/238
[58] Field of Search .................. 99/443 C, 477, 99/478, 467; 126/34, 53, 54; 122/7 R, 6 A; 165/104.31, 104.4, 31, 32, 39, 96, 911; 432/173, 238, 248; 110/235, 336

[56] References Cited

U.S. PATENT DOCUMENTS

| | | | |
|---|---|---|---|
| 1,288,925 | 12/1918 | Knox . | |
| 3,214,153 | 10/1965 | Hauff et al. | 263/44 |
| 3,982,586 | 9/1976 | Ruble | 165/104.31 |
| 4,059,145 | 11/1977 | Ruble | 165/1 |
| 4,125,354 | 11/1978 | Andrews | 431/11 |
| 4,239,638 | 12/1980 | Beretta et al. | 252/73 |
| 4,398,701 | 8/1983 | Cordier et al. | 266/193 |
| 4,995,892 | 2/1991 | Garrett et al. | 65/12 |
| 5,142,999 | 9/1992 | Etemad et al. | 110/235 |

*Primary Examiner*—Reginald Alexander
*Attorney, Agent, or Firm*—Oldham & Oldham Co., LPA

[57] ABSTRACT

The invention describes a method and apparatus for controlling the temperature of the floor of a cooking oven by utilizing a recirculating primary heat transfer fluid made to flow through a heat exchanger located in an oven floor. After traveling through the oven floor and absorbing heat, the primary fluid travels to an external liquid-to-liquid heat exchanger wherein the primary fluid transfers heat to a secondary circulating heat transfer fluid. The primary fluid is then recirculated through the oven floor to maintain the floor at a predetermined temperature. The heated secondary fluid may then be utilized for other processes such as in the conveyor belt washing tank of the oven, or it may be discarded. The primary heat transfer fluid may be a thermal oil having a boiling point substantially in excess of 212° F., and having other properties designed to prevent the corrosion, plugging, and fouling of the heat exchanger located in the oven floor. The second fluid is preferably water. The external liquid-to-liquid heat exchanger is easy to clean and service, while the primary fluid avoids degradation of the oven floor heat exchanger. Various sensors may be used to monitor temperature and/or pressure of both the primary and secondary heat transfer fluids as well as other operational allowing a control system to automatically regulate operation of the system.

17 Claims, 4 Drawing Sheets

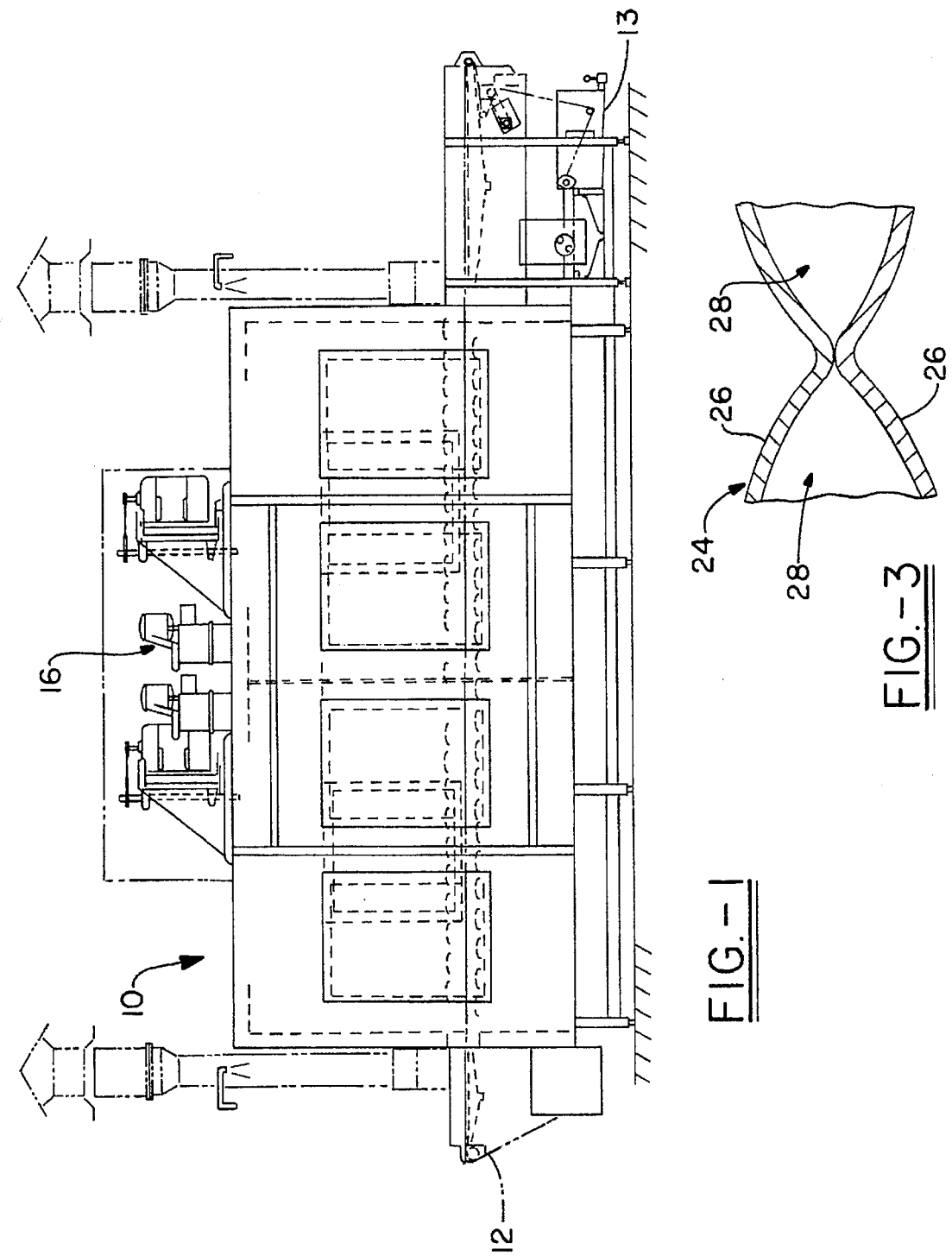

METHOD AND APPARATUS FOR CONTROLLING FLOOR TEMPERATURE IN AN OVEN

TECHNICAL FIELD

This invention relates to food processing ovens, and more particularly to a method and apparatus for controlling the temperature of an oven floor using a recirculating primary thermal fluid to absorb the heat from the oven floor, and a second thermal fluid in conjunction with a liquid-to-liquid heat exchanger to control the temperature of the primary fluid and therefore the oven floor.

BACKGROUND OF THE INVENTION

In large scale food processing ovens, it is desirable to regulate the temperature of the oven floor primarily to prevent fats, oils, and other cooking fluids which fall upon the oven floor from flaming or smoking, which may present a safety risk or result in unacceptable cooking quality. Methods of cooling an oven floor are known in the art. One method uses an oven floor formed as a heat exchanger plate through which water is pumped to absorb heat from the floor and remove it in the waste water.

There are many drawbacks associated with this type of system, and particularly the use of water to cool an oven floor. Normally, the plant water supply is used, resulting in plugging and fouling of the heat exchanger plates used as the floor of the oven due to the high mineral content of the water. Thus far, the solution to this problem has been to regularly halt operation of the oven in order to flush the heat exchanger plates with a chemical cleaning solution designed to remove these mineral deposits. In a continuous cooking operation, such down time lowers productivity. Further, the cleaning process may only remove a portion of the mineral deposits, finally requiring replacement of the heat exchanger plates or resulting in inefficient heat transfer.

Also, due to the relatively low boiling point of water, regulation of the temperature of the oven floor is maintained below the boiling point at approximately 190° F.–200° F. This low temperature is necessary to prevent the water from boiling, and to prevent steam build-up, which would render the system ineffective. However, maintaining the oven floor at this relatively low temperature has several drawbacks. First, it requires a high flow rate of water through the heat-exchanger plates. Depending on the type of oven, anywhere from four (4) to seven (7) gallons of water per minute must be pumped through the heat-exchanger plates in the prior art systems, which results in a waste of water. The prior art systems do not attempt to utilize the heat that has been absorbed by the water for any secondary uses, instead, the heated water is discarded.

Also known in the prior art are a variety of methods for cooling equipment or portions thereof in distinct environments such as high-temperature furnaces, reactors or the like, which are used in the melting or burning of materials. Some of such systems have also relied upon the circulation of water through a system for transfer of heat to the water, allowing heat to be removed from the system with the waste water. Heat exchangers are also used in a variety of other applications, but do not relate to an apparatus or methods to cool an oven floor of an industrial cooking oven used in a continuous cooking process to provide optimum cooking characteristics while preventing flare up or smoking of cooking debris.

Secondly, an oven floor temperature of 190° F.–200° F. unnecessarily cools the remainder of the oven. This temperature is also well below that required to prevent flaming or excessive smoking of grease or other food residue or particles. This results in the need to use more energy to maintain the proper cooking temperature inside the oven. Also, the relatively low floor temperature of the prior art systems resulted in the condensation, on the oven floor, of steam which may be used in the cooking process. This condensation also decreases oven efficiency.

SUMMARY OF THE INVENTION

Based upon the foregoing, it is a primary object of the invention to provide a method and apparatus for controlling the temperature of an oven floor which allows more efficient oven operation and using a recirculating primary thermal fluid to absorb the heat from the oven floor, and a second thermal fluid in conjunction with a liquid-to-liquid heat exchanger to control the temperature of the primary fluid.

The present invention includes the method and apparatus for cooling of an oven floor by utilizing a recirculating primary heat transfer thermal fluid made to flow through at least a first heat exchanger plate in an oven floor. This recirculating primary fluid is designed to minimize corrosion, plugging, and fouling of the heat-exchanger plates. Suitable thermal fluids or oils are well known in the art, and preferably will have a boiling point higher than water. After traveling through the oven floor, and absorbing heat, the primary fluid then travels to an external liquid-to-liquid heat exchanger wherein the primary fluid transfers a predetermined amount of its heat content to a second thermal fluid to maintain the primary fluid and therefore the oven floor at a predetermined temperature. The secondary fluid may be water which once heated by the primary fluid can be used for another desired purpose while the primary fluid is recirculated to a receiving tank or reservoir and eventually recirculated through the oven floor. Various temperature and pressure sensors and controls are utilized to monitor the flow of the thermal fluids and their temperature. Those skilled in the art will recognize that the temperature of the oven floor can be precisely controlled by a number of variables including, the flow rate of the primary fluid through the heat-exchanger plates located in the oven floor, the heat-exchanging capacity of the external heat exchanger, each effectively controlling the temperature of the primary fluid at the time it enters the plates in the oven floor. The temperature of the primary fluid is accurately regulated by varying the temperature or flow of the secondary thermal fluid through the external liquid-to-liquid heat exchanger.

BRIEF DESCRIPTION OF THE DRAWINGS

The features and objects of the invention will become apparent on a further reading of the detailed description in conjunction with the drawings, wherein, FIG. 1 is a somewhat schematic illustration of a large scale food cooking oven including the apparatus of the invention;

FIG. 3 shows an enlarged partial cross-section of the floor of the oven as shown in FIGS. 1 and 2;

DETAILED DESCRIPTION OF THE PREFERRED EMBODIMENTS

Figure 2:
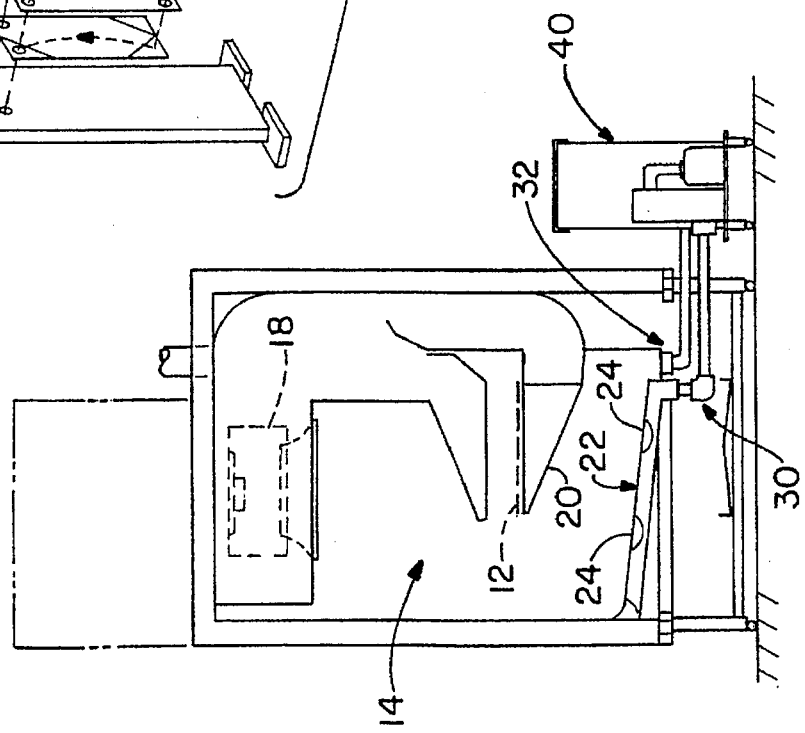
FIG. 2 is a side elevational view of the oven and cooling apparatus of the invention as shown in FIG. 1.

Referring now to FIGS. 1–3, a large scale industrial food cooking oven 10 is used in the preparation of large quantities of various food products including meats, breaded foods and a variety of other products. The machine 10 includes a continuous conveyor system 12 on which food products travel through the oven. A high temperature cooking atmosphere is generated within the cooking chamber 14, by means of gas burner 16, a steam source or other suitable heat source. Recirculating fans 18 may be used to circulate the heated gaseous cooking medium to ducts 20 for impingement on food products positioned on conveyor 12. Due to the nature of food products cooked in oven 10, a variety of debris, drippings, and other residue from the food products may fall onto the conveyor 12 and/or floor 22 of the oven. The conveyor 12 is normally cleaned in a belt cleaning tank 13, into which hot water is introduced along with an appropriate cleaning agent if desired. Due to the high temperatures used in the cooking operation, the floor 22 must be cooled to avoid burning and smoking of the food residue falling thereon. The floor 22 is therefore formed from one or more heat exchanging plates 24. As shown in FIG. 3, the heat exchanger plates 24 are preferably comprised of opposed plates 26, having a series of flow channels 28 formed therebetween. Inlet and exit manifolds 30 and 32 (shown at FIG. 2) allow a cooling fluid to be introduced into the flow channels and circulated throughout the area of plates 24. In this manner, heat is transferred from the upper surface of plates 24 to the fluid to maintain the oven floor 22 at a predetermined temperature. Suitable heat transfer plates 24 are manufactured by the Paul Mueller Co., Springfield, Mo., and other suitable plates would be known to one of ordinary skill in the art. One or more heat transfer plates 24 may be used, with multiple plates being coupled together to form a continuous flow channel from the inlet manifold 30 to the outlet manifold 32. The inlet manifold 30 is coupled to a source of a heat transfer fluid provided in association with the apparatus 40 used to cool the oven floor 22. The apparatus 40 circulates a heat transfer fluid through the flow channels in the heat transfer plates 24 forming floor 22. The circulation of a heat transfer fluid through the floor 22 maintains the temperature of the floor at a predetermined and uniform temperature which can be very precisely controlled by the apparatus 40. It should be recognized that the apparatus 40 can be used in association with any type of cooking oven 10 to precisely control the floor temperature to avoid smoking and burning of food residues.

Figure 6:
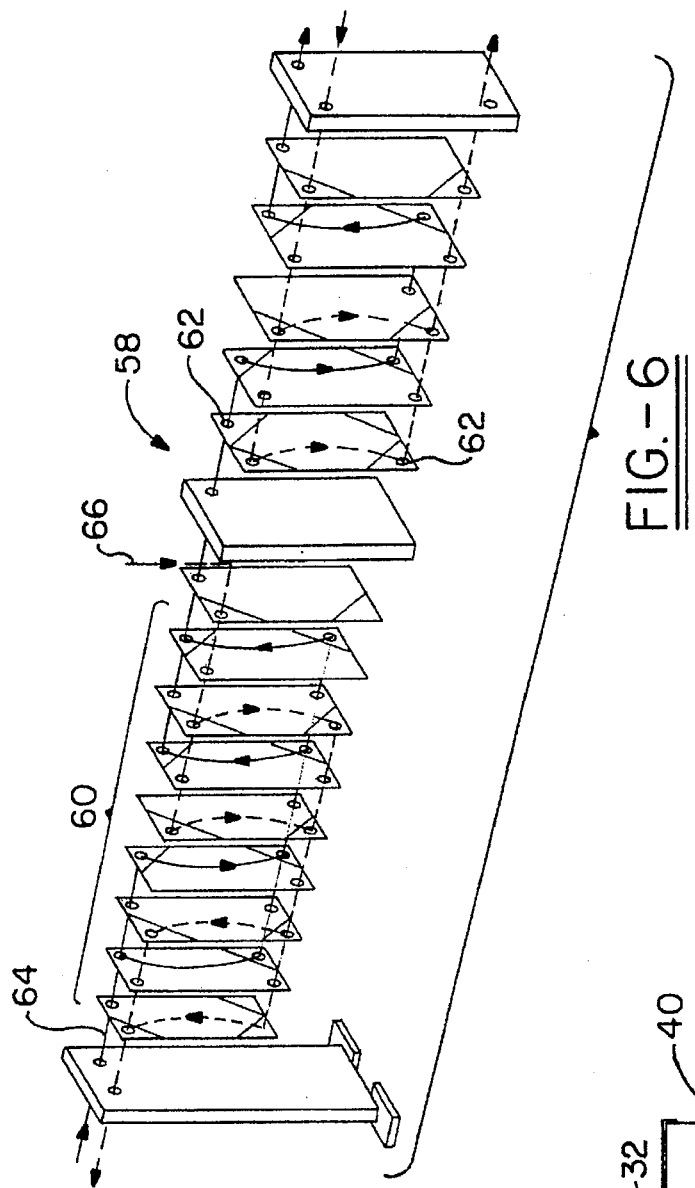
FIG. 6 is a schematic exploded view of a preferred embodiment of the external heat exchanger used in the apparatus as shown in FIG. 4.
Figure 4:
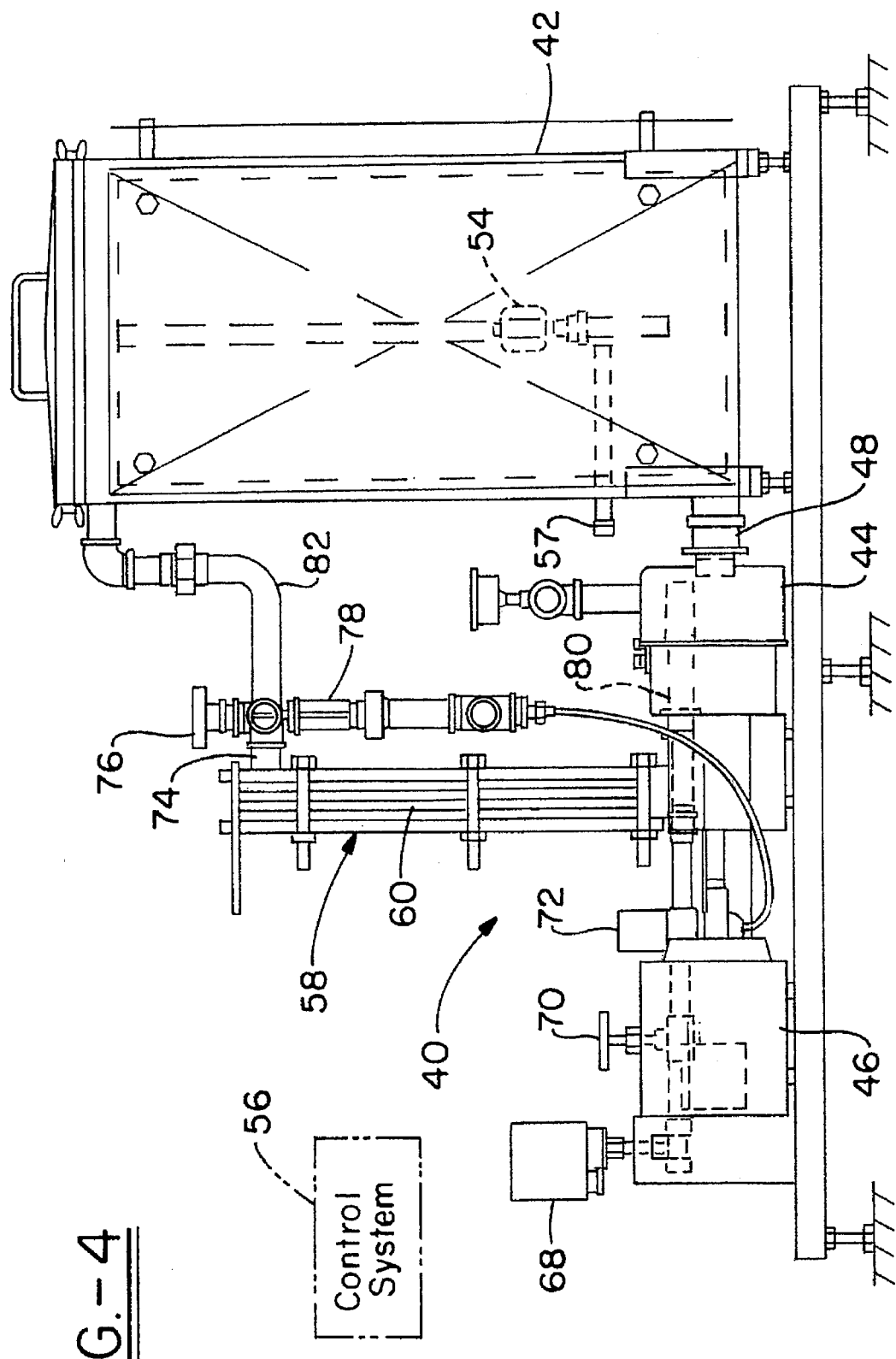
FIG. 4 shows a side elevational view of the cooling apparatus of the invention.
Figure 5:
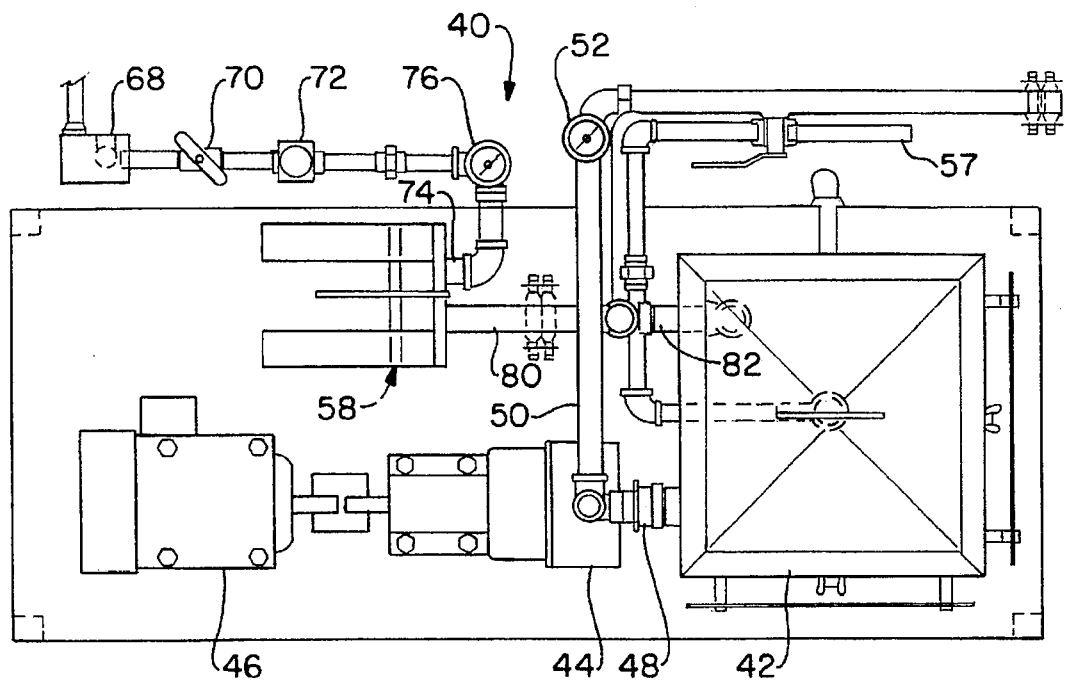
FIG. 5 is a top view of the apparatus as shown in FIG. 4.

The apparatus 40 used to cool an oven floor is more particularly shown in FIGS. 4–6. The apparatus 40 comprises a receiver tank or reservoir 42 designed to hold a quantity of a primary thermal fluid which is circulated through the heat exchanger plates 24 forming oven floor 22. An example of a suitable primary thermal fluid is that sold under the trademark "Therminol®" by the Monsanto Chemical Company. This primary thermal fluid preferably will have a boiling point substantially higher than that of ordinary water. The primary fluid also minimizes corrosion and fouling of the various heat-exchanger plates 24. A pump 44 is utilized to force the primary thermal fluid from the receiver tank 42 to the oven floor. The pump 44 is operated by an electric motor 46 or other suitable arrangement. Thermal fluid from tank 42 is coupled to pump 44 via an outlet pipe 48, and thereafter is pumped to the inlet manifold of the heat transfer plates 24 through pipe 50. The flow rate of the primary thermal fluid through the oven floor is closely controlled to maintain the floor 22 at a desired temperature, and a pressure, and a pressure sensor 52 may therefore be provided on the output pipe 50 from the pump 44 to monitor the pressure and flow of the thermal fluid to the oven floor. Additionally, the temperature of the primary thermal fluid may also be monitored if desired. Also provided within tank 42 is a level sensor 54, used to ensure that an adequate amount of thermal fluid is available within tank 42 for the requirements of use of the apparatus 40 in association with a particular oven for a desired cooking operation. For example, in larger ovens, a larger tank 42 and higher pumping capacity may be used to provide adequate flow rate in conjunction with a larger expanse of heat transfer plates used as the oven floor. It has been found that the use of a primary thermal fluid such as described above provides better heat transfer, and therefore requires less pumping capacity in the apparatus 40, thereby reducing costs and increasing efficiency. If the level of thermal fluid within tank 42 is low, the control system, schematically illustrated at 56, can be used to indicate this condition to the oven operator, to allow more thermal fluid to be introduced into tank 42 via a supply line 57. In the preferred embodiment, as the proper operation of the cooling system 40 in conjunction with the cooking operation is necessary to avoid smoking and other problems, control system 56 may be used to halt operation of the oven itself until proper operation of the cooling system 40 is reinstituted. For example, the control system 56 may be used to turn off the heating system of the oven or the like. The now heated primary thermal fluid travels from the oven 10 to an external liquid-to-liquid heat-exchanger 58 including at least one heat exchanger plate 60 for each of the fluids used in the system. The external heat exchanger 58 allows much of the heat content of the primary thermal fluid to be transferred to a secondary thermal fluid. In the preferred embodiment, the liquid-to-liquid heat exchanger 58 will include a plurality of heat exchanger plate 60 for each of the primary and secondary thermal fluids as shown in FIG. 6. For efficient heat transfer, heat exchanger plate 60 for the primary thermal fluid is disposed adjacent and intermittently in association with a plurality of heat exchanger plates 60 for the secondary thermal fluid. Each of the plates 60 will have port-hole areas which are connected to the source of the thermal fluid and allow circulation through each of the individual heat exchanger plates 60. Each of the plates 60 may be formed with a series of channels which will direct flow of the thermal fluid along a torquous path adjacent the fluid path of the other thermal fluid in an adjacent plate 60. An exact amount of heat transfer from primary thermal fluid to the secondary fluid may be provided by adjusting the flow of each of the fluids through the respective heat exchanger plate 60 through which they circulate, as well as by adjusting the number of plates 60 used with each of the thermal fluids. In the example shown in FIG. 6, the primary thermal fluid may be directed along the solid line path shown at 64, while the secondary fluid is directed along the path of the dash lines at 66, for heat transfer from the primary thermal fluid to the second thermal fluid. The heat exchanger 58 may comprise one or more cells of heat exchanger plate 60 as shown in FIG. 6. The particular arrangement of the heat exchanger 58 must be suitable to effectively transfer heat from the primary fluid to the secondary fluid in an efficient manner, to allow precise regulation of the temperature of the primary thermal fluid for proper operation of the cooking oven. In the preferred embodiment, the number of heat exchanger plates 60 which are used in the heat exchanger 58 can be selectively modified by the user in a simple manner to facilitate adaptation of the system 40 to any particular cooking oven or cooking operation. Heat-exchanger plates suitable for use as the external liquid-to-liquid type are well known in the art, for example the Accu-Therm™ plate heat exchanger manufactured by the Paul Mueller Company, Springfield, Mo.

With reference to FIGS. 4 and 5, the preferred embodiment utilizes water as the secondary thermal fluid, supplied from city service or any other source of water. Water from this external source is supplied into an input coupling 68 and through a needle valve 70 which can be used to adjust flow characteristics of the secondary fluid. In the input line of the secondary thermal fluid, a pressure switch 72 is provided as a safety measure to ensure water is being supplied to the cooling apparatus 40. If for some reason the supply of secondary thermal fluid is stopped, the pressure switch 72 will automatically shut down operation of the cooling apparatus 40 as well as the oven with which it is used via control system 56. The pressure of the supply line for the secondary thermal fluid may also be monitored by the system operator, to allow adjustment of the pressure if desired. The supply of the secondary thermal fluid is then passed to the series of heat exchanger plate 60 as previously described. After passing through the series of heat exchanger plate 60, the secondary thermal fluid exits through an outlet 74 after being heated by the primary thermal fluid. A temperature sensor 76 may be used to monitor the temperature of the outgoing secondary thermal fluid, which when compared with its input temperature will indicate heat transfer from the primary fluid to allow regulation of the primary fluids temperature. It is also a feature of the preferred embodiment to allow the heated secondary thermal fluid output from heat exchanger 58 to be utilized for other processes or tasks. In the preferred embodiment, the heated secondary thermal fluid is supplied to output line 74 which includes a Penn valve 78 which selectively provides the heated solution to the belt wash tank 13.

The Penn valve 78 in association with the temperature sensor 76 will automatically supply water to the belt wash tank 13 when the water reaches a predetermined temperature. The secondary thermal fluid output from the heat exchanger 58 may also be simply discarded if desired.

Similarly, the primary thermal fluid is supplied from the oven floor heat exchanger plates to the external heat exchanger 58 via a supply line 80 connected to the series of heat exchanger plate 60 provided for the primary thermal fluid in heat exchanger 58. After passing through the series of heat exchanger plates, and transferring heat to the secondary thermal fluid, the primary thermal fluid is output to the tank 42 via line 82. From tank 42, the temperature regulated primary thermal fluid is then pumped back to the heat exchanger plates comprising the oven floor via the pump 44 and associated components as previously described.

Figure 7:
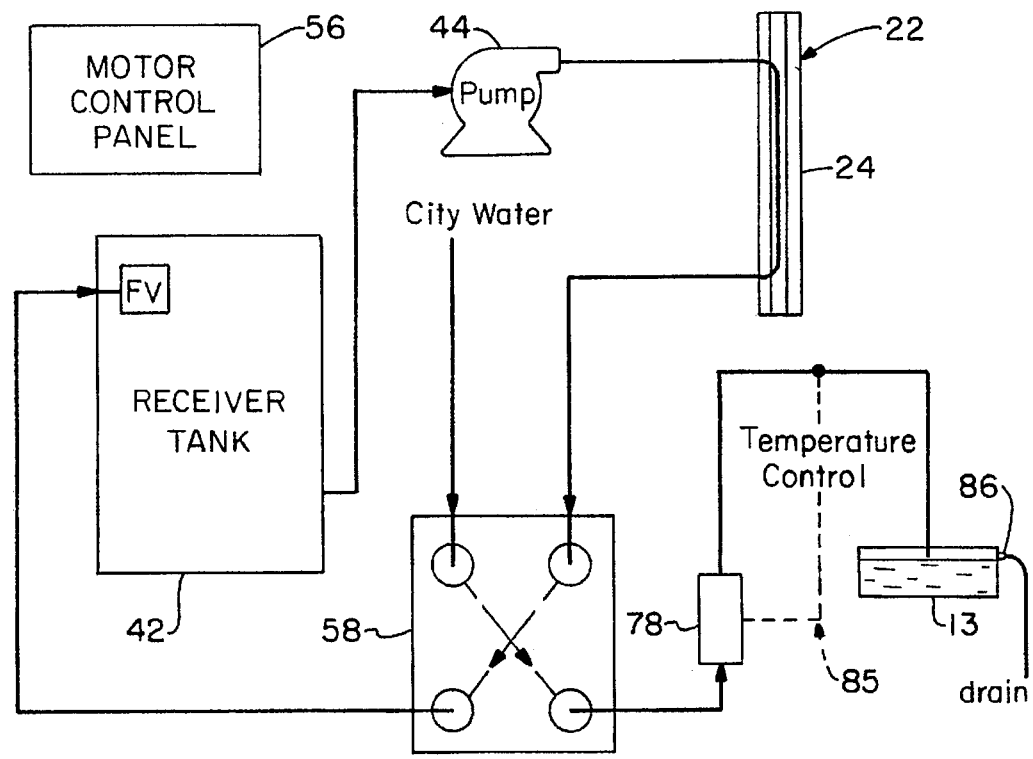
FIG. 7 is a schematic illustration of the operation of the apparatus of the invention.

Turning now to FIG. 7, the overall operation of the cooling apparatus 40 will be described in relationship to the cooking oven with which it is used. Reference is made to components of the system as previously described using similar reference numerals as in prior figures. The oven floor cooling system is designed to provide a method by which the heat exchange plates 24 used in the oven floor 22 can be isolated from coming into contact with a contaminated cooling fluid such as water or the like. A primary thermal fluid which will not cause contamination of the heat exchanger plates 24 is pumped through plates 24 by means of pump 44 which is coupled to a supply of primary thermal fluid or receiver tank 42. The primary thermal fluid is supplied to heat exchanger plates 24 at a predetermined and precise temperature to maintain the oven floor 22 at a predetermined temperature. After the primary thermal fluid is heated in heat exchanger plates 24, it is supplied to an external liquid-to-liquid heat exchanger 58, such as a plate and frame heat exchanger, where heat absorbed by the thermal fluid during traverse of the oven floor 22 is released to a secondary cooling fluid, such as city water, which is also supplied to the external heat exchanger 58. Concurrently, the cooled primary thermal fluid from the external heat exchanger 58 is continuously recirculated back through reservoir 42 and to the oven floor 22 to maintain its temperature at a desired value. The heated water out of the external heat exchanger 58 can then be delivered to the oven conveyor belt wash tank 13 via a pen valve 78 and associated temperature control system generally indicated at 85. Excess water from the belt wash tank 13 may be subsequently transferred to a sewer or treatment facility via drain 86. The pressure and temperature of the primary and secondary thermal fluids and other operational characteristics of the apparatus are controlled by a control system 56, which may include user function switches to allow variation of the operational parameters as desired by an operator.

The use of a thermal fluid which will not cause contamination of heat exchanger plates used as the oven floor allows the oven floor to be maintained at a higher temperature than would be possible using water as a coolant fluid. The use of a thermal fluid having a higher boiling point than water allows the floor cooling system to run at higher temperatures, thereby requiring less energy to maintain desired temperatures within the cooking chamber of the cooking oven. The oven floor is cooled only to the extent necessary to prevent problems of smoking or the like from fallen food debris or residues. For example, the thermal properties of oil fat or drippings which will arise from cooking of many types of food products result in a practical high-temperature limit for the oven floor of approximately 300° F. Enabling the oven floor temperature to be maintained at a point slightly below this value will prevent smoking, while increasing efficiency of the cooking operation. The higher floor temperature also eliminates condensing of steam on the oven floor, by reducing the cooling load significantly, and resulting in increased oven efficiency. For example, it has been found that the cooling load as compared to a water cooling system can be reduced up to 270,000 BTU/HR. The arrangement also allows significantly less thermal fluid to be used to maintain desired floor temperatures, and lessens quantities necessary of water or another secondary thermal fluid to which heat is transferred in the external heat exchanger 58. The oven floor cooling system therefore transfers any problem of plugging or contamination of heat exchanger plates away from the heat exchanger plates used as the oven floor to the external heat exchanger plates which can be easily dismantled and cleaned if necessary. The use of a primary thermal fluid having the described characteristics in the closed-loop system as described also eliminates bacteria growth and prevents freeze-up during winter or colder months, which can occur with the use of water. It should be apparent that many alternatives or variations would be apparent to one of ordinary skill in the art, and are contemplated within the scope of the appended claims without departing from the spirit of the invention.

What is claimed is:

1. An apparatus for regulating the temperature of the floor of a cooking oven comprising:

an oven housing including a floor having a predetermined surface area;

a first heat-exchanger located adjacent to said floor of said oven housing and positioned over a substantial portion of said surface area of said floor, said first heat-exchanger having a first fluid circulated therethrough for transfer of heat from said floor to said first fluid;

a second heat-exchanger through which said first fluid is circulated along with a second fluid, whereby heat from said first fluid is transferred to said second fluid;

a circulating system for circulating said first and second fluids allowing said first fluid to be circulated through said first and second heat-exchangers at a predetermined rate, and circulating said second fluid through said second heat-exchanger at a predetermined rate to maintain the oven floor at a predetermined temperature.

2. An apparatus as recited in claim 1, wherein said first fluid is a thermal fluid having a boiling point greater than 212° F.

3. An apparatus as recited in claim 1, wherein said second fluid is water.

4. An apparatus as recited in claim 1, further comprising, a reservoir for containing a supply of said first fluid connected to said circulating system, with said reservoir including a sensor to sense the level of said first fluid contained therein.

5. An apparatus as recited in claim 4, further comprising, a control system which receives input signals from said sensor, said control system automatically shutting down operation of the cooking oven if the level of said first fluid in said reservoir is below a predetermined level.

6. An apparatus as recited in claim 1, wherein said second heat-exchanger is located exterior to said oven and is a liquid-to-liquid heat exchanger wherein said first and second fluids are heat exchange liquids.

7. An apparatus as recited in claim 1, further comprising a system for monitoring the temperature, pressure, and flow-rate of said first fluid.

8. An apparatus as recited in claim 1, further comprising a system for monitoring the temperature, pressure, and flow-rate of said second fluid.

9. An apparatus as recited in claim 1, further comprising, a system to supply said second fluid to said cooking oven for cleaning of portions thereof.

10. An apparatus as recited in claim 1, wherein said first heat exchanger comprises a plurality of plates having at least one flow channel formed therein through which said first fluid is circulated, said at least one flow channel extending substantially over the entire surface area of said floor.

11. An apparatus as recited in claim 1, wherein said second heat exchanger is a liquid-to-liquid heat exchanger comprising a plurality of heat transfer plates for each of said first and second fluids, each of said plates having said first and second circulation paths formed therein through which said first and second fluids are circulated.

12. An apparatus as recited in claim 11, wherein the number of heat transfer plates may be selectively modified to alter the heat transfer characteristics of said second heat exchanger.

13. An apparatus for regulating the temperature of the floor of a cooking oven, comprising:

an oven housing having a floor;

a first heat exchanger having at least one flow channel through which a primary heat transfer fluid is circulated, said first heat exchanger associated with said floor of said oven housing, said primary heat transfer fluid acting to remove heat from said floor as it is circulated;

a second heat exchanger comprising a plurality of heat transfer plates having at least a first flow channel through which said primary heat transfer fluid is circulated and at least a second flow channel through which a secondary heat transfer fluid is circulated to remove heat form said primary heat transfer fluid and maintain said primary heat transfer fluid at a predetermined temperature;

a circulation system to circulate said primary and secondary heat transfer fluids to maintain said floor at a predetermined temperature.

14. A method for regulating the temperature of a cooking oven floor comprising the steps of:

circulating a primary thermal fluid in a closed path through a first heat-exchanger located adjacent the floor of a cooking oven, whereby heat is transferred from said floor to said primary thermal fluid, and through a second heat-exchanger wherein a portion of the heat content from said primary thermal fluid is removed to maintain said primary thermal fluid at a predetermined temperature;

collecting and recirculating said primary thermal fluid through said first heat-exchanger to maintain said floor at a predetermined temperature.

15. The method as in claim 14, wherein said second heat-exchanger is a liquid-to-liquid heat exchanger containing a secondary thermal fluid used to absorb a portion of the heat content from said primary thermal fluid.

16. The method as in claim 14, further comprising the step of utilizing the heat content of said secondary thermal fluid for other processes.

17. An oven for cooking of food products comprising;

an oven housing having at least one exterior wall and a floor, said floor having a first heat-exchanger adjacent thereto;

a source of heat to provide a heated gaseous cooking atmosphere within said housing, said floor being exposed to said heated gaseous cooking medium within said housing;

said first heat-exchanger having a first fluid circulated therethrough to transfer heat from said oven floor to said first fluid;

a second heat-exchanger positioned outside of said oven housing having first and second fluid circulation paths with said first fluid being circulated from said first heat-exchanger through said first fluid circulation path, and having a second fluid circulated through said second fluid circulation path with heat is transferred from said first fluid to said second fluid, wherein said first and second fluids are circulated at predetermined rates to regulate the temperature of said oven floor to a predetermined temperature.

* * * * *